United States Patent [19]
Benz

[11] Patent Number: 5,060,454
[45] Date of Patent: Oct. 29, 1991

[54] METHOD AND APPARATUS FOR PACKAGING CYLINDRICAL-SHAPED OBJECTS IN BOXES

[75] Inventor: Gottlieb Benz, Flums, Switzerland

[73] Assignee: Maschinenfabrik Flums AG, Switzerland

[21] Appl. No.: 645,895

[22] Filed: Jan. 24, 1991

[30] Foreign Application Priority Data

Jan. 25, 1990 [CH] Switzerland .................. 00233/90
Dec. 14, 1990 [CH] Switzerland .................. 03971/90

[51] Int. Cl.$^5$ ............... B65B 19/00; B65B 19/10; B65B 19/14; B65B 19/34
[52] U.S. Cl. ........................ 53/444; 53/448; 53/475; 53/148; 53/535; 53/537; 53/236; 53/245; 198/347.3
[58] Field of Search .......... 53/148, 152, 153, 537, 53/535, 236, 245, 252, 444, 448, 475; 198/418.6, 431, 347.1, 347.3, 614

[56] References Cited

U.S. PATENT DOCUMENTS

| | | | |
|---|---|---|---|
| 3,107,013 | 10/1963 | Euwe | 53/152 X |
| 3,341,036 | 9/1967 | Bardenhagen | 53/148 X |
| 3,517,478 | 6/1970 | Winch et al. | 53/537 X |
| 3,788,054 | 1/1974 | Haussmann et al. | 198/347.3 X |
| 4,367,618 | 1/1983 | Focke | 53/148 X |
| 4,475,643 | 10/1984 | Klingenberg | 198/347.3 |
| 4,537,008 | 8/1985 | Benz | |
| 4,571,917 | 2/1986 | Wheless et al. | 53/148 |
| 4,607,477 | 8/1986 | Hinchcliffe et al. | 53/148 X |
| 4,633,652 | 1/1987 | Dagenais et al. | 53/152 X |
| 4,633,653 | 1/1987 | Roberts et al. | 53/535 X |
| 4,827,691 | 5/1989 | Hanada et al. | 53/535 X |

Primary Examiner—Horace M. Culver
Attorney, Agent, or Firm—Speckman & Pauley

[57] ABSTRACT

Cylindrical-shaped objects coming from a conveyor belt of a production line are transferred to a compensator. The compensator continuously receives the manufactured cylindrical-shaped objects and transfers them intermittently. Transfer of the cylindrical-shaped objects is made to a carriage guided on rails. A plate with compartments is disposed on the carriage. A quantity of cylindrical-shaped objects corresponding to a layer in a box are placed on the carriage. The carriage is moved in steps by means of a spindle by a step motor. Once the plate on the carriage is filled, the carriage is moved to the side and all the cylindrical-shaped objects lying on it are pushed into the waiting box by a cross slide. Subsequently, the carriage returns to its initial position. This method and apparatus permit extraordinary cycle times, assure gently treatment of the cylindrical-shaped objects and are very adaptable.

10 Claims, 4 Drawing Sheets

METHOD AND APPARATUS FOR PACKAGING CYLINDRICAL-SHAPED OBJECTS IN BOXES

BACKGROUND OF THE INVENTION

1. Field of the Invention

This invention relates to a method and apparatus for continuously packaging in boxes cylindrical-shaped objects manufactured in a production installation.

2. Description of the Prior Art

Two different types of machines for packaging cylindrical-shaped objects such as tubes or empty cases in boxes, operating in accordance with different methods, are being offered in the marketplace. In both types of machines, empty cylindrical-shaped objects, coming in a more or less continuous manner from a production line where they have been produced and printed, reach a machine where they are packed in boxes in which they are forwarded to the factory where they are filled.

In one of the known machines, the cylindrical-shaped objects, stocked in a delivery drum, are conveyed on a slide or inclined piece of sheet metal to a conveyor belt with dividing plates. This belt runs continuously until the desired number of cylindrical-shaped objects is positioned before a pusher. The belt is stopped and a batch of cylindrical-shaped objects is pushed into an auxiliary container or directly into a box, the number of cylindrical-shaped objects being adapted to the dimensions of the box.

In the other known machine, the cylindrical-shaped objects conveyed from a production line are discharged by means of a delivery drum onto an endless conveyor belt made of shells lined up behind each other. The cylindrical-shaped objects in the shells are dumped on a flat conveyor belt and are stopped and pushed together by means of brushes disposed above until the correct number of cylindrical-shaped objects for one layer has been attained, after which the cylindrical-shaped objects are pushed perpendicular to the direction of movement of the belt indirectly or directly into the box.

Both systems have advantages and disadvantages. Although in the first-mentioned machine the cylindrical-shaped objects are treated gently, a change of size in the cylindrical-shaped object requires a set-up time of at least half an hour. In this case, the entire belt with the dividing plates must be changed. In addition to the lost time, there is the considerable added cost of the different, specially designed belts.

The other type of machine can be used for any size cylindrical-shaped object. Only the height of the brush above the conveyor belt must be adapted to the diameter of the cylindrical-shaped objects. However, in this case, the problem is that the guidance of the cylindrical-shaped objects on the flat conveyor belt is not assured. If a cylindrical-shaped object is top-heavy, it may turn and, in this way, upset the order of all of the following cylindrical-shaped objects. A further disadvantage is that the rolls or cases being transported on the flat belt rub against each other and thus are easily scratched. Finally, the operation of this machine has proven to be particularly disadvantageous with cylindrical-shaped objects of laminated plastics which, because of the friction under the brush, can become charged to such a degree that they stick to each other or are completely deformed.

SUMMARY OF THE INVENTION

It is, therefore, an object of this invention to provide a method and apparatus which overcomes the above mentioned disadvantages. This object is attained in accordance with the method and apparatus of this invention in which cylindrical-shaped objects from a production installation are continuously delivered to a compensator in which they are transferred to a carriage and group in accordance with the number desired for a layer. The compensator stops delivering cylindrical-shaped objects to the carriage when the desired number of cylindrical-shaped objects for a layer in the carriage has been reached, all the while continuing to receive cylindrical-shaped objects from the production installation. The carriage is moved away from the compensator where a slide pushes the cylindrical-shaped objects from the carriage crosswise to the direction of the carriage into a box. The box is subsequently lowered by the amount of the height of a cylindrical-shaped object layer. The slide is pulled back from the box and the carriage is moved back to the compensator which is restarted to transfer cylindrical-shaped objects into the carriage at which point the cycle begins again.

An exemplary embodiment of the apparatus of this invention operating in accordance with the method of this invention is shown in the attached drawings and is described below using this exemplary embodiment.

DETAILED DESCRIPTION OF THE PREFERRED EMBODIMENT

Figure 3:
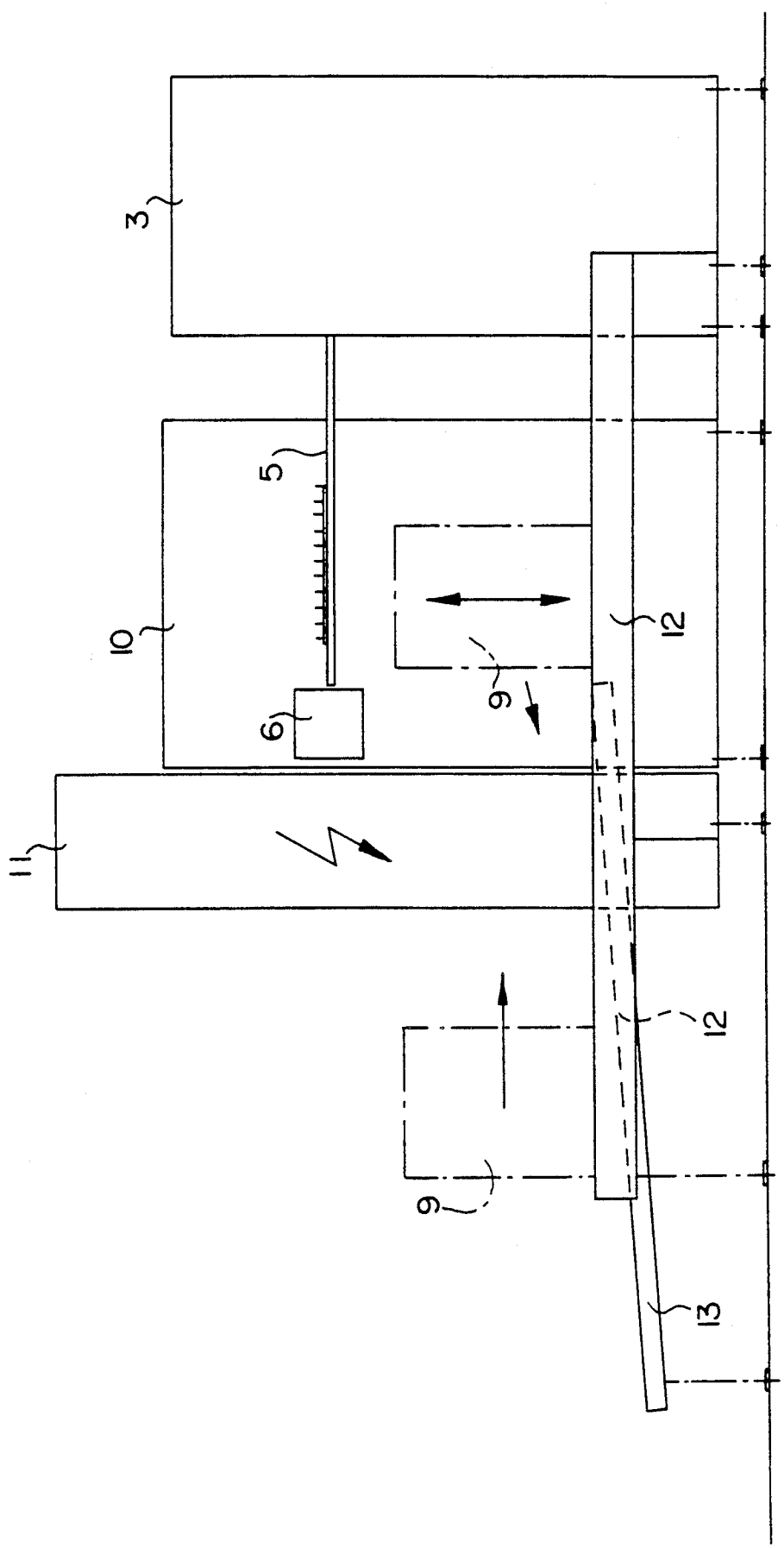
FIG. 3 is a lateral elevational view of the entire machine.

Installations for manufacturing cylindrical-shaped objects are extraordinarily expensive large installations, which must be operated without interruption and at full capacity to the greatest possible extent. Intermittent operation is neither desirable nor feasible. The cylindrical-shaped objects continuously arriving from the production installation 1 are shown to the right of the drawing in FIG. 1. Supply by means of a conveyor belt, such as shown here, has obviously only a symbolic meaning. The cylindrical-shaped object packing machine is designated by reference numeral 2 in FIG. 1 and is shown again in FIG. 3 in a lateral view. The main components of the packing machine are the compensator 3, the box conveyor 10 and the electronic control 11. The cylindrical-shaped objects, continuously arriving from the production installation, are transferred to the compensator in which they are transported to the box conveyor 10 and pushed, grouped in layers, from the box conveyor 10 into the boxes 9. Compensators, as well as box conveyors, are known to those skilled in the art. The crux of the present invention is the conveyance of the cylindrical-shaped objects from the compensator 3 to the box conveyor 10 and from there into the box 9. The box 9 is transported by means of a conveyor belt 12 into the box conveyor 10 and is lifted there in such a way that the cylindrical-shaped objects can be pushed in layers into the box 9, after which the box is lowered by an amount corresponding to the height of a layer and the next layer of cylindrical-shaped objects is pushed in. Once the box 9 is completely filled, it is moved to one side and slides to the shipping department on the roller conveyor 13.

Figure 1:
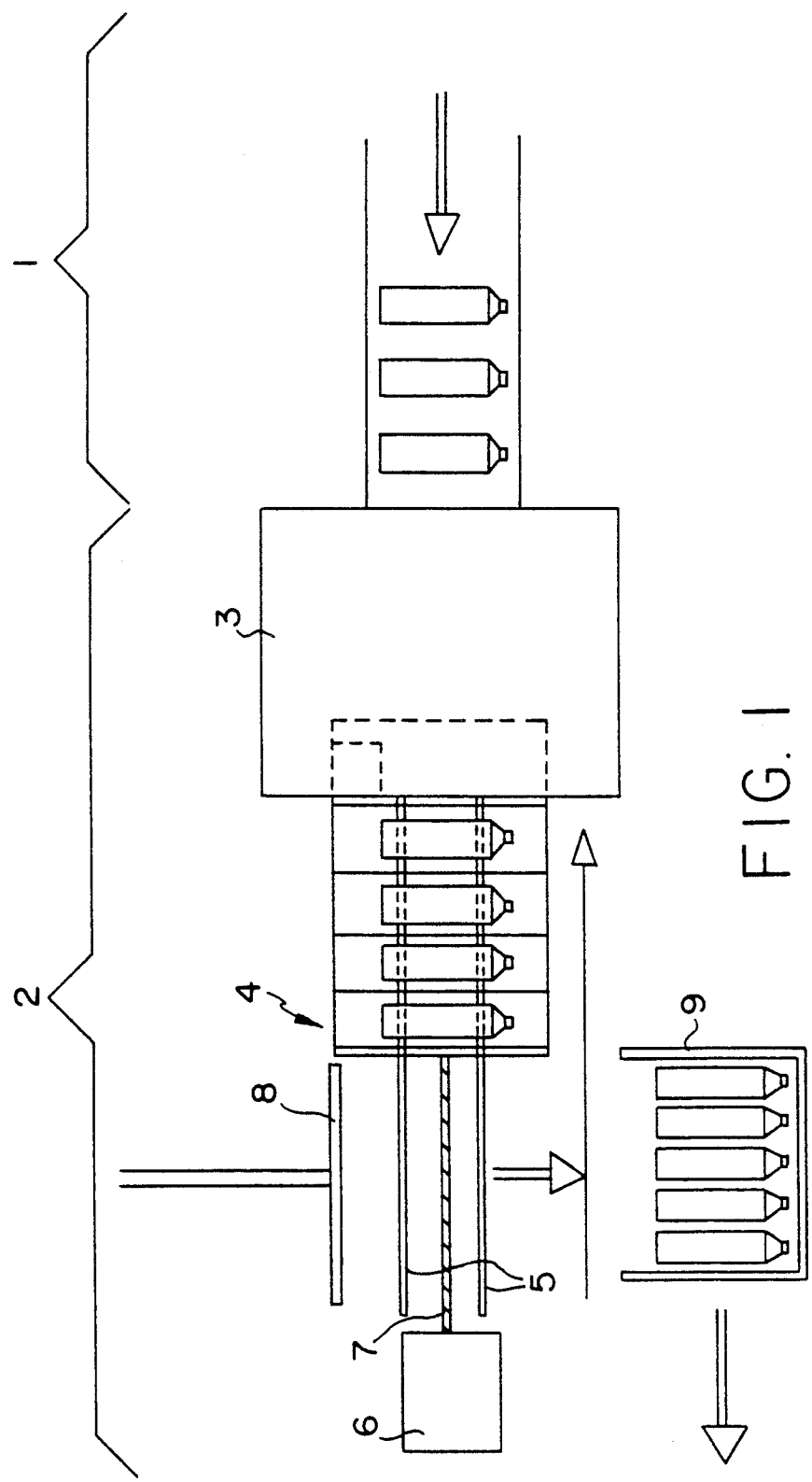
FIG. 1 shows a top view of the conveyor belt for the cylindrical-shaped objects from the delivery point of the compensator to placement in the box.

A carriage 4 is provided for transporting the cylindrical-shaped objects from the compensator 3 into the box 9. The carriage 4 rolls on tracks 5 extending at least from the compensator 3 into the area where the cylindrical-shaped objects are pushed into the waiting box 9 from the carriage 4. This is accomplished by the cross slide 8, which is aligned crosswise to the direction of movement of the carriage 4. The carriage 4 rolling on the rails 5 is moved by a step motor 6 connected to a spindle 7. Obviously, the step motor could also move the carriage 4 back and forth in accordance with a control program using a toothed belt. The carriage 4 is moved in steps in a cycle which is faster than the cylindrical-shaped objects come continuously from the production facility. The path per step of the carriage corresponds to the compartment 45 of the sheet metal plate 44 (see FIG. 4). Once the amount of cylindrical-shaped objects required for forming a layer has been deposited on the plate 44, the compensator 3 is stopped in the area of its delivery point 38 and the carriage 4 moves sideways far enough so that it is aligned with the box 9 and the cylindrical-shaped objects can be pushed off the plate 44 by the cross slide 8. Then the carriage 4 is again pushed completely to the right as shown in FIG. 1 on the rails 5, so that during the next delivery of a cylindrical-shaped object, the compartment 45, which is located the farthest to the left, is filled and that now the carriage can be moved in steps towards the left again.

Direct insertion of the cylindrical-shaped objects into the box 9 is a particularly inexpensive method; however, it requires cardboard of good quality. If it is desired to operate at maximum speed, the time for exchanging the boxes 9 must be very short. This can be accomplished by pushing the cylindrical-shaped objects not directly into the box, but first onto an intermediate carrier which pushes all of the cylindrical-shaped objects corresponding to a full box together into the box. During this time, the subsequent cylindrical-shaped objects are pushed on an auxiliary intermediate carrier until the main intermediate carrier is again free, whereupon the subsequent cylindrical-shaped objects lying on the auxiliary intermediate carrier are placed on the main intermediate carrier. This system is already known from Swiss Letters Patent No. 658,632 and extensively described therein.

Figure 2:
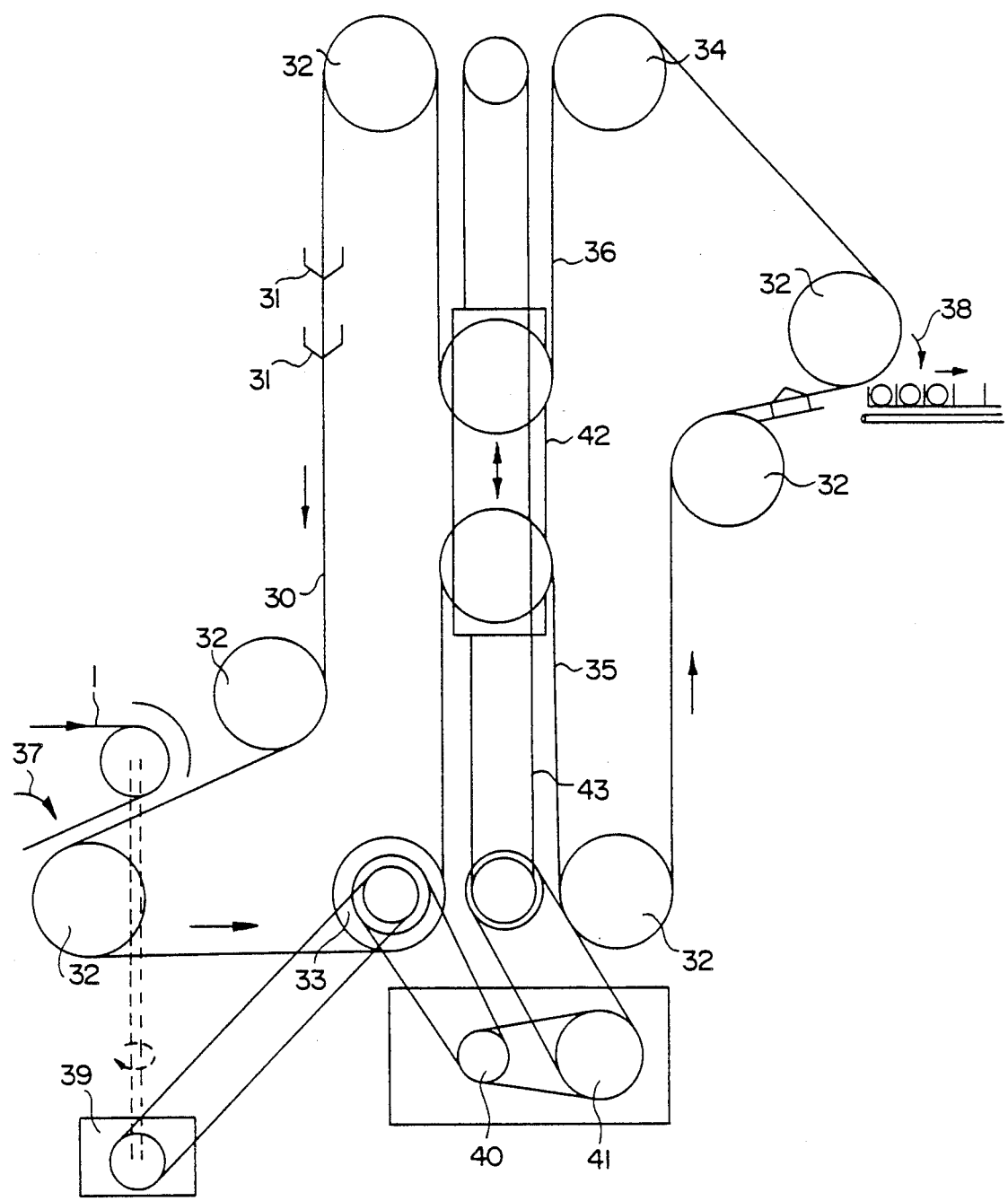
FIG. 2 is a schematic view of the compensator.

The compensator is an essential feature of this invention. A compensator particularly preferred for this machine is shown in FIG. 2. The compensator consists of two parallel endless chains 30 running in the same direction, between which gondolas 31 have been placed. The gondolas 31 are used for transporting the cylindrical-shaped objects. Only a few gondolas 31 have been shown in the drawings. In practice, one gondola closely follows the other in a tight sequence. The chains 30, running over deflection rollers 32, are impelled by a drive roller 33. The loading station 37, where the cylindrical-shaped objects coming from the production line are transferred to the gondolas 31, is located all the way to the left in FIG. 2. Here the chain 30 must run continuously and synchronously with the conveyor belt of the production line. Only in this way is it assured that all the cylindrical-shaped objects coming from the production department can be received without interruption. This synchronization of speed is attained by a synchronized drive 39 which is mechanically coupled directly with the production line. The gondolas 31 run downwards from the loading station 37 to the lowest point, after which the chain 30 is upwardly guided in a first loop 35 and then again downwardly back to the lowest point and is directed from there to the delivery point 38. This section is clearly shown in FIG. 4. From the delivery point 38, the endless chain runs to the highest point by way of a braking roller 34 and is guided from there again downward and after that upward in the form of a second loop 36. At the end of the second loop, the endless chain 30 is again guided downward to the loading station 37 and then over the drive roller 33. The two loops 35 and 36 run over deflection rollers disposed on an upwardly and downwardly movable frame 42. This movable frame 42 is moved by means of a chain 43 fixed on the frame 42 and running over an upper deflection roller and a lower drive roller. Drive of this chain 43 is accomplished passively by means of a coupling unit 40 and the brake unit 41, which operates diametrically opposite in time in respect to the brake 34.

The carriage 4 is moved in the cycle of the arriving gondolas 31 and the cylindrical-shaped objects are deposited on the previously described sheet metal plate 44 at the delivery point 38. Once the carriage or the plate 44 has been filled with the required amount of cylindrical-shaped objects, delivery of the cylindrical-shaped objects must be stopped for a short time. The brake roller 34 is stopped for this purpose, however, the continuously operating drive roller 33 continues to run. In this way the loop 36, containing nothing but empty gondolas 31, is shortened. Thus the chain 30 continues to run past the LOADING STATION 37. In the same degree in which the loop 36 is shortened, the frame 42 runs upwards in a free-wheeling manner and the loop 35 is correspondingly LENGTHENED. Once the plate 44 has been emptied and the carriage 4 has been returned into its initial position, the chain in the delivery area 38 is allowed to run again, that is, the brake roller 34 can be disengaged again. Now the loop 35 with nothing but filled gondolas 31 is large and the loop 36 with empty gondolas is small. Presumably the loop 36 would be too short when the chain 30 is next stopped at the delivery point 38, i.e. there would not be a sufficient amount of empty gondolas which in the meantime could be filled at the loading station 37. Therefore, the brake unit 41 is activated and again pulls the movable frame 42 into its lower initial position by means of the chain 43. This means that, in addition to the continuous drive speed at the drive roller 33, an additional speed component appears at the drive roller 33, which corresponds to the shortening of the loop 35. In this manner, it is possible to assure continuous operation at the loading station 37 and intermittent operation at the delivery point 38. The differing delivery speed of the cylindrical-shaped objects to the plate 44 of the carriage 4 requires that the carriage 4 is moved in accordance with the speed of the endless chain 30 in the area of the delivery point. The step motor 6 which drives the carriage 4 by means of the spindle 7 or the toothed belt therefore must be moved in phase in accordance with the speed of the deflection roller 32 in the area of the delivery point 38. For this purpose, its rotational speed is electronically sensed and evaluated in the electronic control 11 and appropriate control impulses are delivered to the step motor 6.

Figure 4:
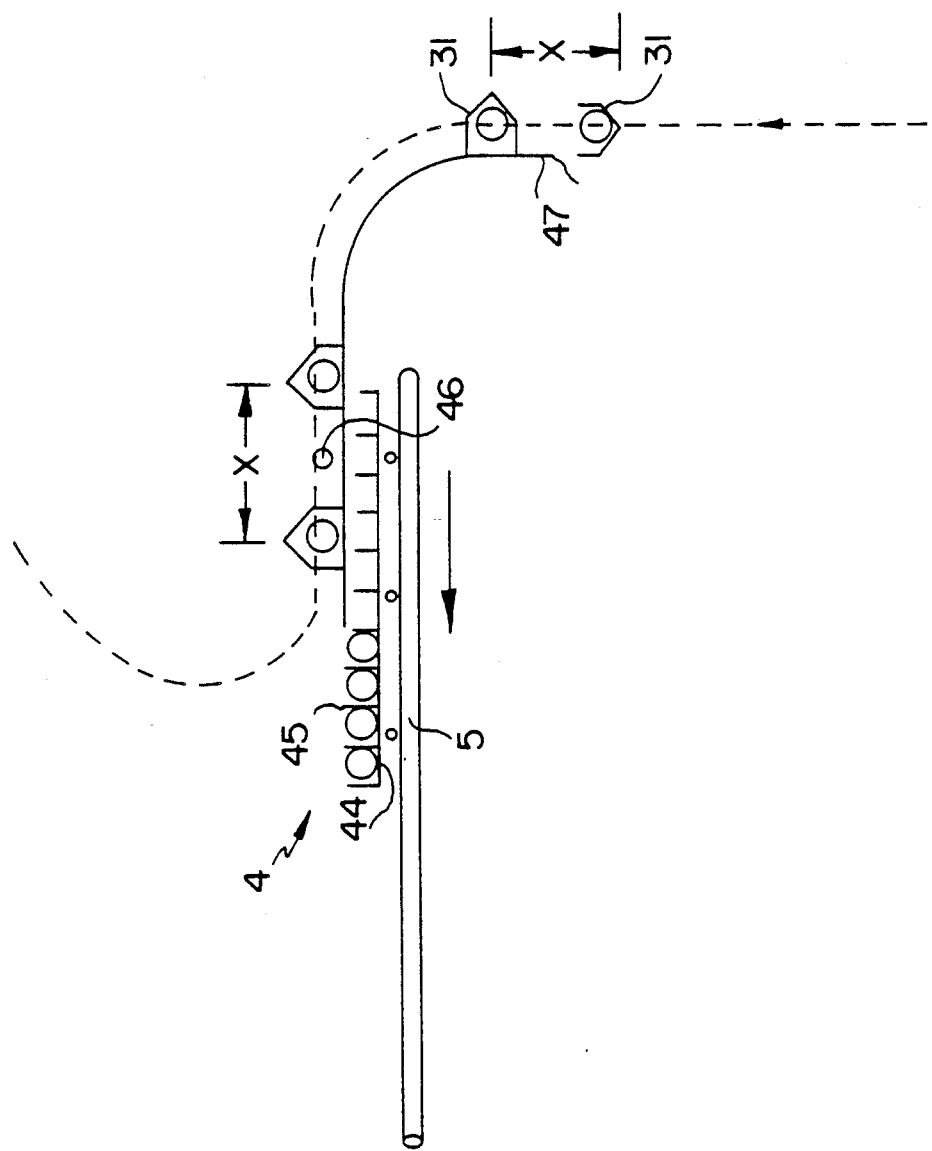
FIG. 4 is a schematic view of the discharge of the cylindrical-shaped objects from the compensator to the sheet metal surface of the carriage.

The cylindrical-shaped objects manufactured on the production line are tested in a fully automatic manner and are discarded, if they do not meet the requirements. This means that not every gondola 31 reaching the delivery point 38 is filled with a cylindrical-shaped object. This must be determined electronically so that no compartment 45 remains empty. FIG. 4 illustrates how this is accomplished. The gondolas 31, arriving one after the other at a distance X from each other, contact a guide plate 47 by which the gondolas 31 are tilted by 90°, but which at the same time prevents the cylindrical-shaped objects resting in them from sliding out, because the gondolas 31 are now covered by the guide plate 47. Sliding over the guide plate 47, the gondolas are conducted over the area of the rails 5 on which the carriage 4 rolls. The carriage 4, which can be pushed under the guide plate 47, together with its plate 44 is pulled out sufficiently far from underneath the guide plate 47 in steps corresponding to the compartments 45, so that at the end of the guide plate, the next cylindrical-shaped object in the sequence falls out of the gondola 31 into the empty compartment 45 of the plate 44.

The presence of a cylindrical-shaped object in a gondola 31 is checked by means of a photoelectric cell 46. Since the gondolas or shells 31 are the same for all sizes of cylindrical-shaped objects, it is possible for smaller cylindrical-shaped objects to roll back and forth inside the gondola 31. This could result in multiple switch-ons. To avoid this, the photoelectric cell 46 is also operated in the cycle of the arriving gondolas 31. The photoelectric cell can switch only once within one cycle. In this way unwanted erroneous switch-ons are made impossible.

The method and apparatus of this invention permit a high degree of flexibility. If, for example, the size of the cylindrical-shaped objects is changed in the production facility, it is only necessary to exchange the plate 44, secured to the carriage by at least two positioning pins and at least one fastening screw, for another plate with compartments 45 adapted to the new cylindrical-shaped object size. Any other changes resulting therefrom, for example the number of cylindrical-shaped objects per layer and the lateral displacement path of the carriage 4, can be input by means of a program control unit. Thus the total resetting of the machine to the changed format is a matter of a few minutes. Also, changes in the shape of the boxes while maintaining the size of the cylindrical-shaped objects no longer is a problem. The appropriate changes can be input directly into the program control. Accordingly, a larger or smaller amount of cylindrical-shaped objects can be deposited on the plate 44. The lateral displacement path is correspondingly adapted to the new box shape. Furthermore, it is also possible to change the number of cylindrical-shaped objects per layer by respectively one cylindrical-shaped object to ensure the closest possible cylindrical-shaped object stacking within the box. This, too, is simply a matter of programming. Such layering of the cylindrical-shaped objects cannot be attained with the packaging machines available up to now.

To increase the cyclic rate of the machine it is also possible to operate with two carriages. Each carriage then is supported on one side seated on a rail and is equipped, for example, with a lift cylinder. In this way, it is possible to move the first carriage to the side and to load the second carriage in the previously described manner. The first carriage is emptied as before and is then lowered by means of the lift cylinder, so that it can move away under the second carriage, which now moves on the upper level. It now waits at the end, in the area of the delivery point, underneath the second carriage until the latter moves aside after being loaded. Now the first carriage is lifted again upwards into its initial position at the delivery point. In this manner it is possible to shorten the cyclic rate, thus speeding up the method and, at the same time, make the compensator smaller, which now only needs to bridge a decreased buffer time. Such a machine can also be operated with two carriages in accordance with the method for a single carriage, which is sensible in those cases where it is necessary to alternately operate with two different sizes of cylindrical-shaped objects without it being necessary to reset the machine every time.

I claim:

1. A method for packaging cylindrical-shaped objects, continuously arriving from a continuous supply (1), in a box (9), comprising continuously delivering cylindrical-shaped objects to a compensator (3) from said continuous supply (1), delivering said cylindrical-shaped objects in cycles and under opto-electric monitoring from said compensator (3) to a carriage (4) grouped in accordance with a desired number for a layer, stopping said compensator (3) at a delivery point (38) for delivering said cylindrical-shaped objects to said carriage (4) while continuing to run said compensator at a loading station (37) for receiving said cylindrical-shaped objects from said continuous supply (1), and while said compensator is stopped at said delivery point, moving said carriage (4) from said delivery point and with a slide (8) pushing the cylindrical-shaped objects from the carriage (4) perpendicular to a direction of movement of said carriage (4) into said box (9), lowering said box (9) by an amount of a height of said layer while simultaneously pulling the slide (8) back and moving the carriage (4) back to said delivery point, and commencing movement of the compensator (3) at said delivery point (38).

2. A method for packaging cylindrical-shaped objects, continuously arriving from a continuous supply (1), in a box (9), comprising continuously delivering said cylindrical-shaped objects to a compensator (3) from said continuous supply (1), delivering said cylindrical-shaped objects in cycles and under opto-electric monitoring from said compensator to a first carriage (4) grouped in accordance with a desired number for a layer, stopping said compensator (3) at a delivery point (38) for delivering said cylindrical-shaped objects to said first carriage while continuing to run said compensator at a loading station (37) for receiving said cylindrical-shaped objects from said continuous supply (1), and while said compensator is stopped at said delivery point moving said first carriage (4) from said delivery point and moving a second carriage to said delivery point, commencing movement of the compensator (3) at said delivery point (38), and pushing said cylindrical-shaped objects from said first carriage with a slide (8) perpendicular to a direction of movement of said first carriage into said box (9), lowering said box (9) by an amount of a height of said layer while simultaneously pulling the slide (8) back and moving said first carriage back to said delivery point, said first carriage remaining in a waiting position until said second carriage which is filled moves to a side.

3. A method in accordance with claim 1, wherein carriage (4) is moved in steps in accordance with a cycle of said cylindrical-shaped objects delivered to said delivery point and where an order to move said carriage forward is relayed to a carriage drive (6) only if said cylindrical-shaped object is present at said delivery point.

4. A method in accordance with claim 1, wherein a number of compartments (45) to be filled on said carriage (4) and a lateral displacement path of said carriage (4) is determined by a size of said boxes (9) and is controlled by a program control unit.

5. A method in accordance with claim 2, wherein each of said first carriage and said second carriage moves from said delivery point to one side on an upper level, is unloaded and then moves back into said waiting position on a lower level.

6. An apparatus for packaging cylindrical-shaped objects comprising a compensator (3), continuously loadable with cylindrical-shaped objects; transfer means for non-continuously transferring said cylindrical-shaped objects to at least one conveying means for conveying said cylindrical-shaped objects; a box conveyor (10) positioned to receive said cylindrical-shaped objects from said conveyor means; said conveyor means further comprising at least one carriage (4) having a plate (44) exchangeably fixed thereupon and having compartments (45) adapted to a size of said cylindrical-shaped objects to be conveyed onto said box conveyor (10); and said carriage (4) being movable by a step motor (6) controlled by an electronic control (11).

7. An apparatus in accordance with claim 6, wherein a photoelectric cell (46) is disposed before a transfer area of said cylindrical-shaped objects to said plate (44) and provides a switching and counting pulse to a program circuit connected with said electronic control (11) for each of said cylindrical-shaped objects conveyed to said transfer area.

8. An apparatus in accordance with claim 6, wherein said compensator (3) has an endless chain (30) with gondolas (31) fixed upon it, said chain (30) having a first loop (35) and a second loop (36), said first loop (35) being disposed in a first area between a delivery point (38) and a loading station (37) and said second loop (36) being disposed in a second area between said loading station (37) and said delivery point (38), and, in said second area between said second loop (36) and said delivery point (38), said chain (30) being led around a drum (34) which can be braked in accordance with a movement of said carriage, while on a loading side, said chain (30) being driven in a third area between said first loop (35) and said second loop (36) at a speed which is synchronous with that of a production line, where said first loop (35) and said second loop (36) are guided around a first deflection roller and a second deflection roller, respectively, said first deflection roller and said second deflection roller being disposed on a movable frame (42), said movable frame being returnable to its initial position by a braking unit (41) having an electrical coupling unit (40).

9. An apparatus in accordance with claim 6, wherein the exchangeable plate (44) having compartments (45) is secured to said carriage by at least two positioning pins and at least one fastening screw.

10. An apparatus in accordance with claim 6, wherein said conveyor means has two carriages, each of which is supported with one side on one of two parallel rails and is provided with means for changing their vertical position.

* * * * *